(12) United States Patent
Jiang et al.

(10) Patent No.: US 9,753,601 B2
(45) Date of Patent: Sep. 5, 2017

(54) ELECTROMAGNETIC-TYPE TOUCH DISPLAY APPARATUS

(71) Applicants: SHANGHAI TIANMA MICRO-ELECTRONICS CO., LTD., Shanghai (CN); TIANMA MICRO-ELECTRONICS CO., LTD., Shenzhen (CN)

(72) Inventors: Wenxin Jiang, Shanghai (CN); Sitao Huo, Shanghai (CN)

(73) Assignees: SHANGHAI TIANMA MICRO-ELECTRONICS CO., LTD., Shanghai (CN); TIANMA MICRO-ELECTRONICS CO., LTD., Shenzhen (CN)

( * ) Notice: Subject to any disclaimer, the term of this patent is extended or adjusted under 35 U.S.C. 154(b) by 0 days.

(21) Appl. No.: 15/453,792

(22) Filed: Mar. 8, 2017

(65) Prior Publication Data

US 2017/0177122 A1    Jun. 22, 2017

Related U.S. Application Data

(63) Continuation of application No. 14/479,142, filed on Sep. 5, 2014, now Pat. No. 9,612,702.

(30) Foreign Application Priority Data

Mar. 31, 2014   (CN) .......................... 2014 1 0126714

(51) Int. Cl.
*G06F 3/041*   (2006.01)
*G06F 3/046*   (2006.01)
(Continued)

(52) U.S. Cl.
CPC .......... *G06F 3/046* (2013.01); *G02F 1/13338* (2013.01); *G02F 1/133512* (2013.01);
(Continued)

(58) Field of Classification Search
CPC . G06F 3/041; G06F 3/045; G06F 3/04; G06F 3/044; G06K 11/06; G08C 21/00; G02F 1/133
See application file for complete search history.

(56) References Cited

U.S. PATENT DOCUMENTS

| 6,246,393 B1 * | 6/2001 | Watanabe | ............... G06F 3/046 178/18.01 |
| 9,001,084 B2 * | 4/2015 | Yamamoto | .............. G06F 3/041 345/175 |

(Continued)

*Primary Examiner* — Pegeman Karimi
(74) *Attorney, Agent, or Firm* — Alston & Bird LLP (57) ABSTRACT

An electromagnetic-type touch display apparatus is disclosed. The apparatus comprises: a first substrate; a second substrate; a first conductive layer formed on the first substrate comprising first electromagnetic induction coils forming loops extending in a first direction; and a second conductive layer formed between the first and second substrates comprising second electromagnetic induction coils forming loops extending in a second direction perpendicular to the first direction. Each of the substrates comprises a display region and a non-display region, and the first and second electromagnetic induction coils are used to determine a touch position, wherein, at least one of the first conductive layer and the second conductive layer is also configured as at least one film layer of the first substrate or the second substrate, which forms a pattern required by the first or second electromagnetic induction coils and transmits a sensing signal.

15 Claims, 7 Drawing Sheets

(51) Int. Cl.
*G06F 3/044* (2006.01)
*G02F 1/1333* (2006.01)
*G02F 1/1335* (2006.01)

(52) U.S. Cl.
CPC ............ G06F 3/044 (2013.01); G06F 3/0412 (2013.01); G06F 3/0416 (2013.01); *G06F 2203/04107* (2013.01)

(56) References Cited

U.S. PATENT DOCUMENTS

| | | | | |
|---|---|---|---|---|
| 2008/0303774 | A1* | 12/2008 | Yoshinaga | G06F 3/0412 345/98 |
| 2011/0109583 | A1* | 5/2011 | Lee | G06F 3/044 345/174 |
| 2012/0206403 | A1* | 8/2012 | Wang | G02F 1/13338 345/174 |
| 2013/0147730 | A1* | 6/2013 | Chien | G06F 3/0412 345/173 |

* cited by examiner

ELECTROMAGNETIC-TYPE TOUCH DISPLAY APPARATUS

CROSS-REFERENCES TO RELATED APPLICATIONS

This application is a continuation of U.S. patent application Ser. No. 14/479,142, titled "ELECTROMAGNETIC-TYPE TOUCH SUBSTRATE AND ELECTROMAGNETIC-TYPE TOUCH DISPLAY APPARATUS", filed on Sep. 5, 2014 with USPTO, which claims the priority to Chinese Patent Application No. 201410126714.7, titled "ELECTROMAGNETIC-TYPE TOUCH SUBSTRATE AND ELECTROMAGNETIC-TYPE TOUCH DISPLAY APPARATUS", filed on Mar. 31, 2014 with the State Intellectual Property Office of People's Republic of China, both of which are hereby incorporated by reference in their entireties.

TECHNICAL FIELD

The disclosure relates to the panel display technologies, and in particular, to an electromagnetic-type touch substrate and an electromagnetic-type touch display apparatus.

BACKGROUND OF THE INVENTION

Touch sensing technologies have been widely applied in various electronic products in daily work and life in recent years. As a user can touch a touch screen with a hand or with other objects to input information, dependence of the user on other input devices such as a keyboard, a mouse and a remote controller may be reduced or even eliminated, thereby facilitating operations of the user.

The touch screen may be electromagnetic-type, capacitive-type, resistive-type or the like. In an electromagnetic-type touch screen, an electromagnetic field of the electromagnetic induction coils in the touch screen may be changed by changing a distance between an electromagnetic stylus including a coil and the touch screen including exciting coils and the induction coils, and accordingly, weak currents are generated. A touch position may be obtained by performing a calculation on the generated currents.

For a conventional electromagnetic-type touch screen, usually, an out-cell electromagnetic-type touch panel is applied. The electromagnetic-type touch panel takes a flexible circuit board as a carrier on which electromagnetic induction coils are provided. In practice, an electromagnetic-type touch screen formed by the out-cell electromagnetic-type touch panel and a display panel results in a large thickness and a complicated wiring. Furthermore, the flexibility of the flexible circuit board in the electromagnetic-type touch panel is actually redundant, thereby causing a waste in cost.

BRIEF SUMMARY OF THE INVENTION

One inventive aspect is an electromagnetic-type touch display apparatus, comprising: a first substrate; a second substrate, arranged opposite to the first substrate; a first conductive layer formed on a first side of the first substrate far away from the second substrate, wherein the first conductive layer comprises a plurality of first electromagnetic induction coils forming loops extending in a first direction; and a second conductive layer formed between the first substrate and the second substrate, wherein the second conductive layer comprises a plurality of second electromagnetic induction coils forming loops extending in a second direction perpendicular to the first direction, wherein, each of the first substrate and the second substrate comprises a display region and a non-display region, and the first electromagnetic induction coils and the second electromagnetic induction coils are used to determine a touch position, wherein, at least one of the first conductive layer and the second conductive layer is also configured as at least one film layer of the first substrate or the second substrate except for the first conductive layer and the second conductive layer, which forms a pattern required by the first electromagnetic induction coils or the second electromagnetic induction coils and transmits a sensing signal.

BRIEF DESCRIPTION OF THE DRAWINGS

To more clearly explain a technical solution according to embodiments of the disclosure, drawings to be used in the following description of the embodiments are briefly introduced hereinafter. Apparently, those drawings are merely exemplary, and other drawings may be further obtained by the ordinary skilled in the art based on the drawings without creative works.

DETAILED DESCRIPTION OF THE PREFERRED EMBODIMENTS

A technical solution according to embodiments of the disclosure is described clearly and completely hereinafter in conjunction with drawings used in description of the embodiments. Apparently, the described embodiments are merely a part of rather than all of the embodiments of the disclosure. All other embodiments obtained by those skilled in the art based on the embodiments of the disclosure without any creative works shall fall in the scope of the disclosure.

To make the technical solution according to the embodiments of disclosure clearer, the solution is detailed in conjunction with the drawings in the following descriptions of the embodiments.

Figure 1:
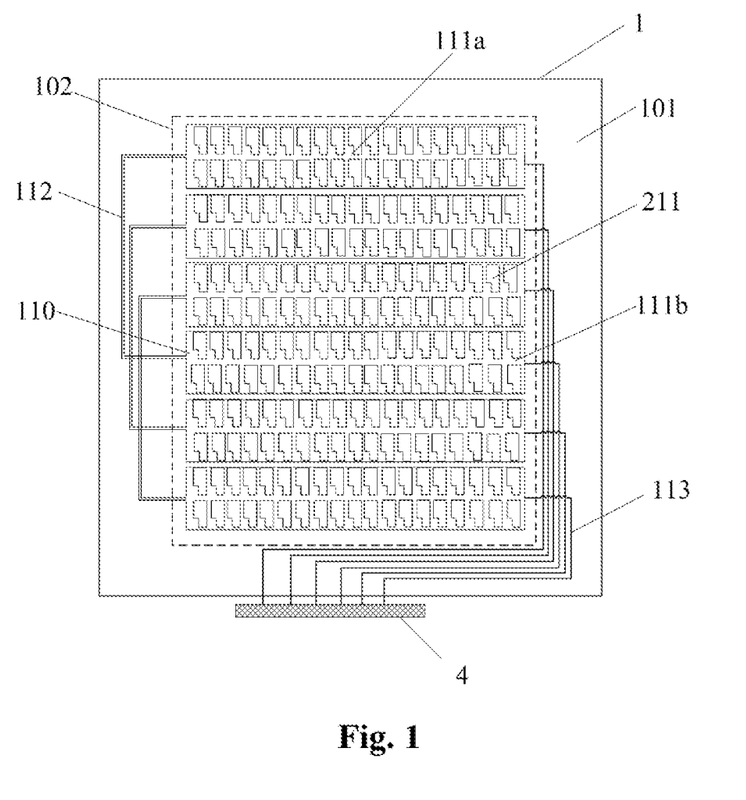
FIG. 1 is a schematic structural diagram of one side of an electromagnetic-type touch substrate according to an embodiment of the present invention.
Figure 2:
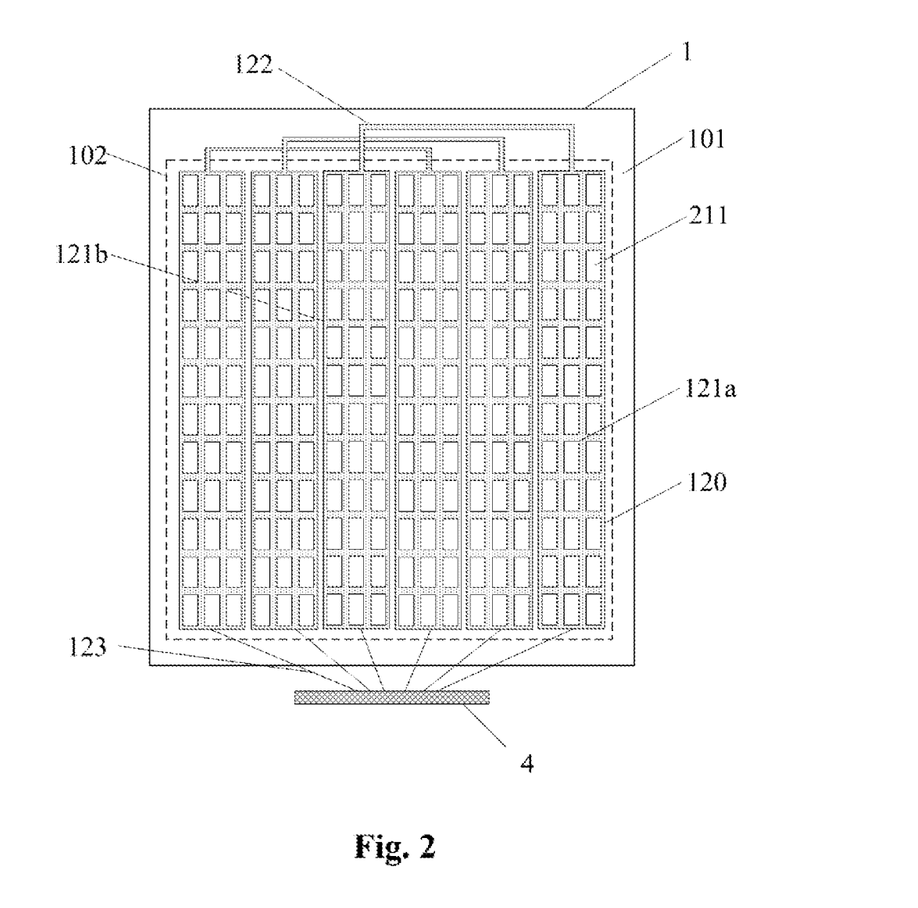
FIG. 2 is a schematic structural diagram of another side of the electromagnetic-type touch substrate shown in FIG. 1.

An electromagnetic-type touch substrate is provided according to an embodiment of the disclosure. FIG. 1 is a schematic structural diagram of one side of the electromagnetic-type touch substrate according to the embodiment of the disclosure. FIG. 2 is a schematic structural diagram of another side of the electromagnetic-type touch substrate shown in FIG. 1. As shown in FIG. 1, the electromagnetic-type touch substrate includes a substrate 1. The substrate 1 includes a display region 102 for displaying an image, and a non-display region 101 around the display region 102. The substrate 1 may be a transparent glass substrate or a flexible resin substrate. A first conductive layer is formed on one side of the substrate 1. The first conductive layer includes multiple first electromagnetic induction coils 110 which extend in a first direction and form loops. According to the embodiment, the first direction is the horizontal direction. As shown in FIG. 1, each first electromagnetic induction coil 110 includes a sensing electrode 111a and a sensing electrode 111b arranged in parallel in the display region 102, and a first connecting wire 112 arranged in the non-display region 101 for connecting the sensing electrode 111a to the sensing electrode 111b. Ends of the sensing electrode 111a and the sensing electrode 111b on one side are connected to each other by the first connecting wire 112. Ends of the sensing electrode 111a and the sensing electrode 111b on the other side are respectively connected to a driving chip 4 via first signal transmission wires 113, to receive a sensing signal. A uniformity of the image displayed in the display region 102 may be improved since the first connecting wires 112 are arranged in the non-display region 101. The sensing electrode 111a in a first row is connected to the sensing electrode 111b in a fourth row by the first connecting wire 112, to form one first electromagnetic induction coil 110. Alternatively, a sensing electrode in an $n^{th}$ row may be connected to a sensing electrode in an $m^{th}$ row by the first connecting wire 112, to form one first electromagnetic induction coil 110, where each of n and m is an positive integral equal to or larger than 1, and less than a total number of the sensing electrodes. Values of n and m may be arbitrary in the above-defined range, and may be set reasonably based on a size of the substrate, a pixel resolution, an electromagnetic induction algorithm, etc.

As shown in FIG. 2, a second conductive layer is formed on another side of the substrate 1. The second conductive layer includes multiple second electromagnetic induction coils 120 which extend in a second direction and form loops. According to the embodiment, the second direction is the vertical direction. Hence, the first direction is perpendicular to the second direction. Each second electromagnetic induction coil 120 includes a sensing electrode 121a and a sensing electrode 121b arranged in parallel in the display region 102, and a second connecting wire 122 arranged in the non-display region 101 for connecting the sensing electrode 121a to the sensing electrode 121b. Ends of the sensing electrode 121a and the sensing electrode 121b on one side are connected to each other by the second connecting wire 122. Ends of the sensing electrode 121a and the sensing electrode 121b on the other side are respectively connected to the driving chip 4 by second signal transmission wires 123, to receive a sensing signal. The uniformity of the image displayed in the display region 102 may be improved since the second connecting wires 122 are arranged in the non-display region 101. The sensing electrode 121a in a first column is connected to the sensing electrode 121b in a fourth column by the second connecting wire 122, to form one second electromagnetic induction coil 120. Alternatively, a sensing electrode in an $i^{th}$ column may be connected to a sensing electrode in a $j^{th}$ column by the second connecting wire 122, to form one second electromagnetic induction coil 120, where each of i and j is an positive integral equal to or larger than 1, and smaller than a total number of the sensing electrodes. Values of i and j may be arbitrary in the above-defined range, and may be set reasonably based on the size of the substrate, the pixel resolution, the electromagnetic induction algorithm, etc.

The electromagnetic-type touch substrate according to the embodiment may function as a color film substrate for display apparatuses in types of, for example, In-plane Switching (IPS), Fringe Field Switching (FFS), and Twisted Nematic (TN). Usually, to avoid a static electricity caused during manufacturing and using the display apparatuses, a shielding electrode layer may be formed on one side of the color film substrate. In case of a transient static electricity, the static electricity is discharged via the shielding electrode layer. Hence, a torsion of a liquid crystal molecule may not be influenced by the static electricity, and the image may not be displayed abnormally. The first conductive layer according to the embodiment may be a transparent shielding electrode layer formed with strips functioning as the sensing electrodes 111a and the sensing electrodes 111b of the first electromagnetic induction coils 110. A projection of each sensing electrode onto the array substrate may cover at least one row of sub-pixels 211.

A black matrix layer is arranged on the other side of the color film substrate. The black matrix layer is adopted for preventing a backlight leakage, improving a contrast of the displayed image, preventing a color mixing and increasing a color purity. Generally, the black matrix layer is made of a resin material including black dyes and is non-conductive. The black matrix layer according to the embodiment is made of a conductive light-shading material such as titanium sub-oxide or chromium, to transmit the sensing signal. The second conductive layer may be a black matrix layer formed with strips functioning as the sensing electrodes 121a and the sensing electrodes 121b of the second electromagnetic induction coils 120. A projection of each sensing electrode onto the array substrate may cover at least one column of the sub-pixels 211.

In the electromagnetic-type touch substrate according to the embodiment of the disclosure, the first conductive layer (i.e., the shielding electrode layer) including the first electromagnetic induction coils is formed on one side of the substrate, and the second conductive layer (i.e., the black matrix layer or a common electrode layer) including the second electromagnetic induction coils is formed on the other side of the substrate. Compared with a conventional art in which a liquid crystal display panel and a module with an electromagnetic input function are assembled in an out-cell manner, the manufacturing process may be simplified, a thickness and a complexity of an electromagnetic-type touch screen may be reduced, a touch display panel is light and thin, and the manufacturing cost is saved.

It should be noted that the embodiment is merely exemplary. Other film layers of the substrate, such as the common electrode layer, may be used to implement the first conductive layer or the second conductive layer, as long as the film layers may form a pattern required by the first electromagnetic induction coils or by the second electromagnetic induction coils and the film layers may transmit the sensing signal.

Figure 3:
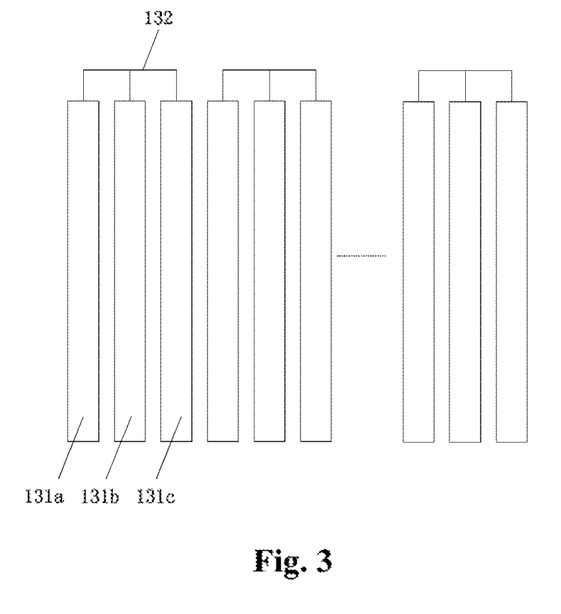
FIG. 3 is a schematic structural diagram of first electromagnetic induction coils or second electromagnetic induction coils according to an embodiment of the present invention.

FIG. 3 is a schematic structural diagram of first electromagnetic induction coils or second electromagnetic induction coils according to an embodiment of the disclosure. Different from the electromagnetic induction coils shown in FIG. 1 and FIG. 2, each first electromagnetic induction coil or each second electromagnetic induction coil according to the embodiment includes three sensing electrodes 131a, 131b and 131c arranged in parallel. Ends of the three sensing electrodes on one side are connected to each other by a third connecting wire 132. Ends of the three sensing electrodes on the other side are connected to a driving chip (not illustrated in FIG. 3) by a third signal transmission wire.

Figure 4:
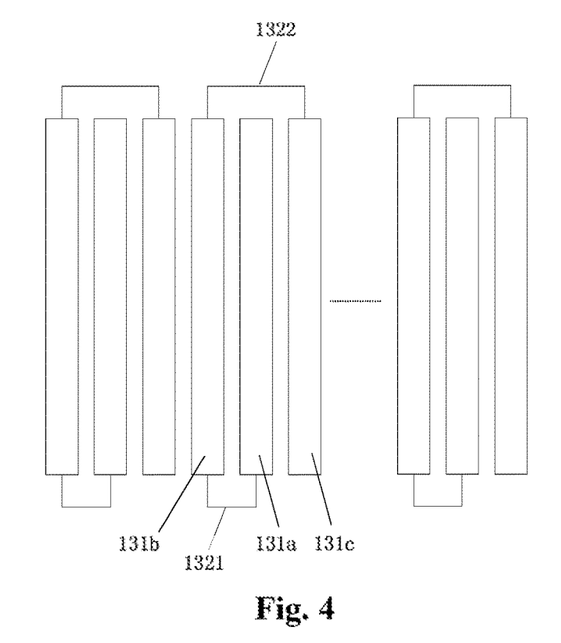
FIG. 4 is another schematic structural diagram of first electromagnetic induction coils or second electromagnetic induction coils according to an embodiment of the present invention.

FIG. 4 is another schematic structural diagram of first electromagnetic induction coils or second electromagnetic induction coils according to an embodiment of the disclosure. Different from the electromagnetic induction coils shown in FIG. 1 and FIG. 2, each first electromagnetic induction coil or each second electromagnetic induction coil according to the embodiment includes a first sensing electrode 131a, a second sensing electrode 131b and a third sensing electrode 131c arranged in parallel. The first sensing electrode 131a is arranged between the second sensing electrode 131b and the third sensing electrode 131c. A third connecting wire 132 includes a first connecting wire segment 1321 and a second connecting wire segment 1322, arranged in a non-display region 101. Ends of the first sensing electrode 131a and the second sensing electrode 131b on one side are connected to each other by the first connecting wire segment 1321. Ends of the second sensing electrode 131b and the third sensing electrode 131c on the other side are connected to each other by the second connecting wire segment 1322.

Figure 5:
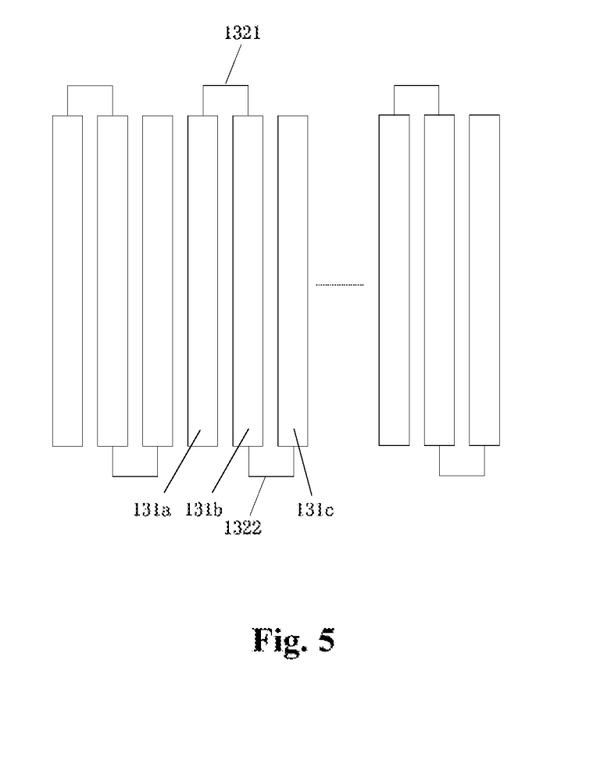
FIG. 5 is further another schematic structural diagram of first electromagnetic induction coils or second electromagnetic induction coils according to an embodiment of the present invention.

FIG. 5 is further another schematic structural diagram of first electromagnetic induction coils or second electromagnetic induction coils according to an embodiment of the disclosure. Different from the electromagnetic induction coils shown in FIG. 1 and FIG. 2, each first electromagnetic induction coil or each second electromagnetic induction coil according to the embodiment includes a first sensing electrode 131a, a second sensing electrode 131b and a third sensing electrode 131c arranged in parallel. The second sensing electrode 131b is arranged between the first sensing electrode 131a and the third sensing electrode 131c. A third connecting wire 132 includes a first connecting wire segment 1321 and a second connecting wire segment 1322, arranged in a non-display region 101. Ends of the first sensing electrode 131a and the second sensing electrode 131b on one side are connected to each other by the first connecting wire segment 1321. End of the second sensing electrode 131b and the third sensing electrode 131c on the other side are connected to each other by the second connecting wire segment 1322.

Figure 6:
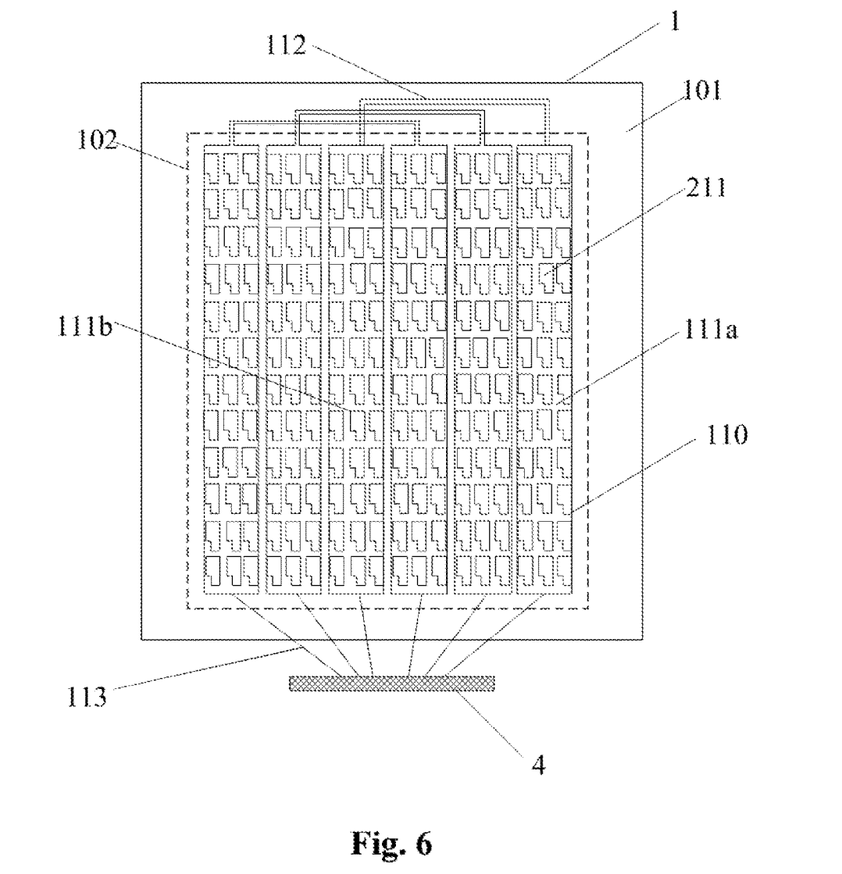
FIG. 6 is a schematic structural diagram of one side of another electromagnetic-type touch substrate according to an embodiment of the present invention.
Figure 7:
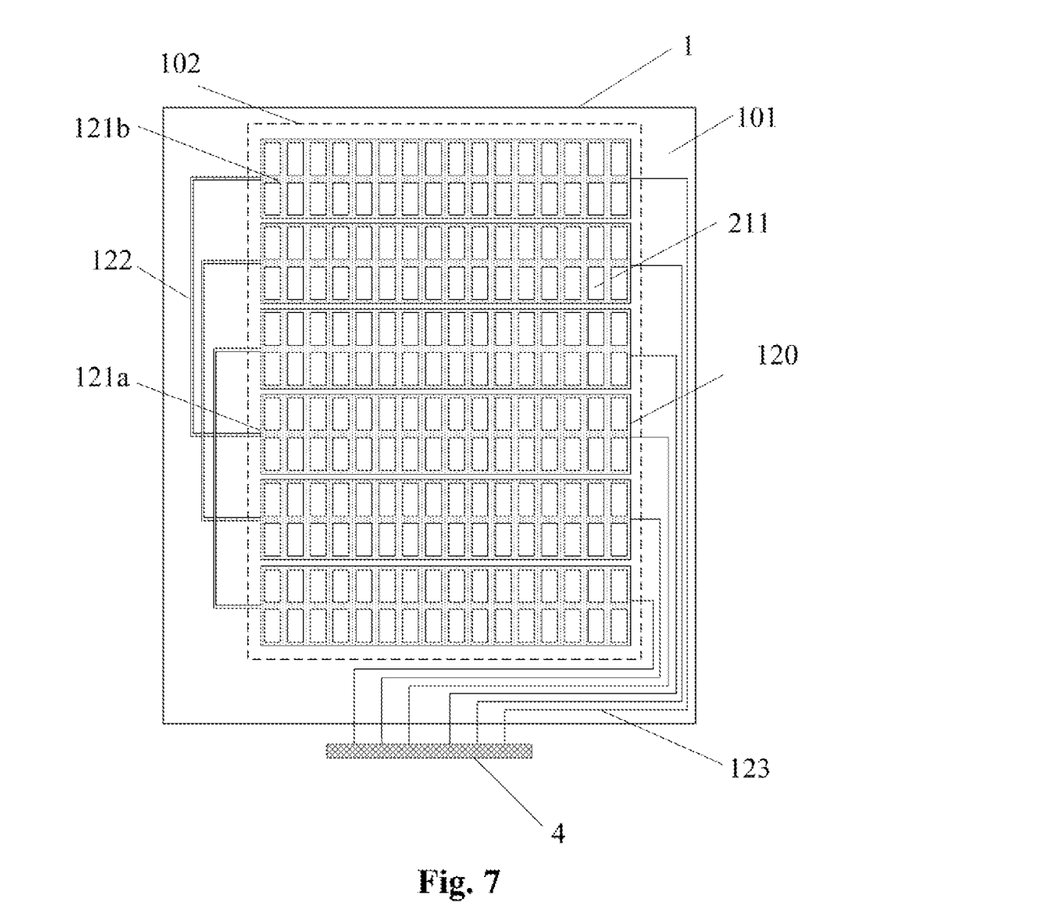
FIG. 7 is a schematic structural diagram of another side of the electromagnetic-type touch substrate shown in FIG. 6.

FIG. 6 is another schematic structural diagram of one side of an electromagnetic-type touch substrate according to an embodiment of the disclosure. FIG. 7 is a schematic structural diagram of another side of the electromagnetic-type touch substrate shown in FIG. 6. As shown in FIG. 6, a first conductive layer is formed on one side of a substrate 1. The first conductive layer according to the embodiment is a shielding electrode layer which includes multiple first electromagnetic induction coils 110 extending in a vertical direction and forming loops. Each first electromagnetic induction coil 110 includes two sensing electrodes 111a and 111b arranged in parallel in a display region 102, and a first connecting wire 112 arranged in a non-display region 101 for connecting the sensing electrode 111a to the sensing electrode 111b. A uniformity of the image displayed in the display region 102 may be improved since the first connecting wires 112 are arranged in the non-display region 101. The sensing electrode 111a in a first column is connected to the sensing electrode 111b in a fourth column by the first connecting wire 112, to form one first electromagnetic induction coil 110. Alternatively, a sensing electrode in an $n^{th}$ column may be connected to a sensing electrode in an $m^{th}$ column by the first connecting wire 112, to form one first electromagnetic induction coil 110, where each of n and m is an positive integral equal to or larger than 1, and less than a total number of the sensing electrodes. Values of n and m may be arbitrary in the above-defined range, and may be set reasonably based on a size of the substrate, a pixel resolution, an electromagnetic induction algorithm, etc.

As shown in FIG. 7, a second conductive layer, i.e., a black matrix layer is formed on the other side of the substrate 1. The second conductive layer includes multiple second electromagnetic induction coils 120 extending in a horizontal direction and forming loops. Each second electromagnetic induction coil 120 includes two sensing electrodes 121a and 121b arranged in parallel in the display region 102, and a second connecting wire 122 arranged in the non-display region 101 for connecting the sensing electrode 121a to the sensing electrode 121b. The uniformity of the image displayed in the display region 102 may be improved since the second connecting wires 122 are arranged in the non-display region 101. The sensing electrode 121a in a first row is connected to the sensing electrode 121b in a fourth row by the second connecting wire 122, to form one second electromagnetic induction coil 120. Alternatively, a sensing electrode in an $i^{th}$ row may be connected to a sensing electrode in a $j^{th}$ row by the second connecting wire 122, to form one second electromagnetic induction coil 120, where each of i and j is an positive integral equal to or larger than 1, and smaller than a total number of the sensing electrodes. Values of i and j may be arbitrary in the above-defined range, and may be set reasonably based on the size of the substrate, the pixel resolution, the electromagnetic induction algorithm, etc.

It should be noted that, the first electromagnetic induction coils or the second electromagnetic induction coils shown in FIGS. 6 and 7 may be implemented with any one or any combination of structures described in FIG. 3, FIG. 4 and FIG. 5, which is not further described herein.

Figure 8:
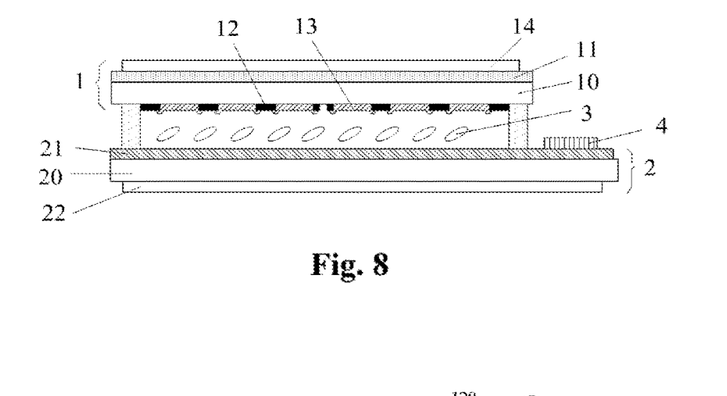
FIG. 8 is a schematic sectional view of an electromagnetic-type touch display apparatus according to an embodiment of the present invention.

FIG. 8 is a sectional view of an electromagnetic-type touch display apparatus according to an embodiment of the disclosure. As shown in FIG. 8, the electromagnetic-type touch display apparatus includes an electromagnetic-type touch substrate 1, and an array substrate 2 arranged opposite to the electromagnetic-type touch substrate 1. The array substrate 2 includes multiple pixel units (not illustrated in FIG. 8). A liquid crystal layer 3 is arranged between the electromagnetic-type touch substrate 1 and the array substrate 2. Torsions of liquid crystal molecules in the liquid crystal layer 3 are controlled by changing an electrical field, to display an image. The electromagnetic-type touch substrate 1 includes a first substrate 10. A first conductive layer is arranged on one side of the first substrate 10, away from the liquid crystal layer 3. According to the embodiment, the first conductive layer is a shielding electrode layer 11. The shielding electrode layer 11 includes multiple first electromagnetic induction coils which extend in a first direction and form loops. Each first electromagnetic induction coil includes sensing electrodes arranged in parallel in a display region, and a first connecting wire arranged in a non-display region for connecting the sensing electrodes. A projection of each sensing electrode onto the array substrate may cover at least one line of sub-pixels. Structures of the first electromagnetic induction coils are same as the structures described in FIG. 1 or FIG. 6 and are not further described herein. A first polarizer 14 is arranged on one side of the shielding electrode layer, away from the first substrate 10.

A second conductive layer, i.e., a black matrix layer 12, and a color filter layer 13 are arranged on the other side of the first substrate 10, facing the liquid crystal layer 3. The black matrix layer 12 is conductive and may be made of a conductive light-shading material such as titanium sub-oxide or chromium. The color filter layer 13 may include light resistors of various colors such as red (R), green (G) and blue (B). The black matrix layer 12 includes multiple second electromagnetic induction coils which extend in a second direction and form loops. Each second electromagnetic induction coil includes sensing electrodes arranged in parallel in the display region, and a second connecting wire arranged in the non-display region for connecting the sensing electrodes. A projection of each sensing electrode onto the array substrate may cover at least one line of sub-pixels. Structures of the second electromagnetic induction coils are same as the structures described in FIG. 2 or FIG. 7 and are not further described herein.

The array substrate 2 includes a second substrate 20. A thin film transistor element layer 21 is arranged on one side of the second substrate 20, facing the liquid crystal layer 3. The thin film transistor element layer 21 includes pixel electrodes and common electrodes. A horizontal electrical field is generated between the pixel electrodes and the common electrodes, to control the torsions of the liquid crystal molecules, and accordingly, the image is displayed. A driving chip 4 is arranged at a step of the second substrate 20 with respect to the first substrate 10, to provide a driving signal to the array substrate and to provide a sensing signal to the electromagnetic-type touch substrate. A second polarizer 22 is arranged on one side of the second substrate 20, away from the liquid crystal layer 3.

In the electromagnetic-type touch substrate according to the embodiment of the disclosure, the first conductive layer (i.e., the shielding electrode layer) including the first electromagnetic induction coils is formed on one side of the substrate, and the second conductive layer (i.e., the black matrix layer or a common electrode layer) including the second electromagnetic induction coils is formed on the other side of the substrate. Compared with a conventional art in which a liquid crystal display panel and a module with an electromagnetic input function are assembled in an out-cell manner, the manufacturing process may be simplified, a thickness and a complexity of an electromagnetic-type touch screen may be reduced, a touch display panel is light and thin, and the manufacturing cost is saved.

Figure 9:
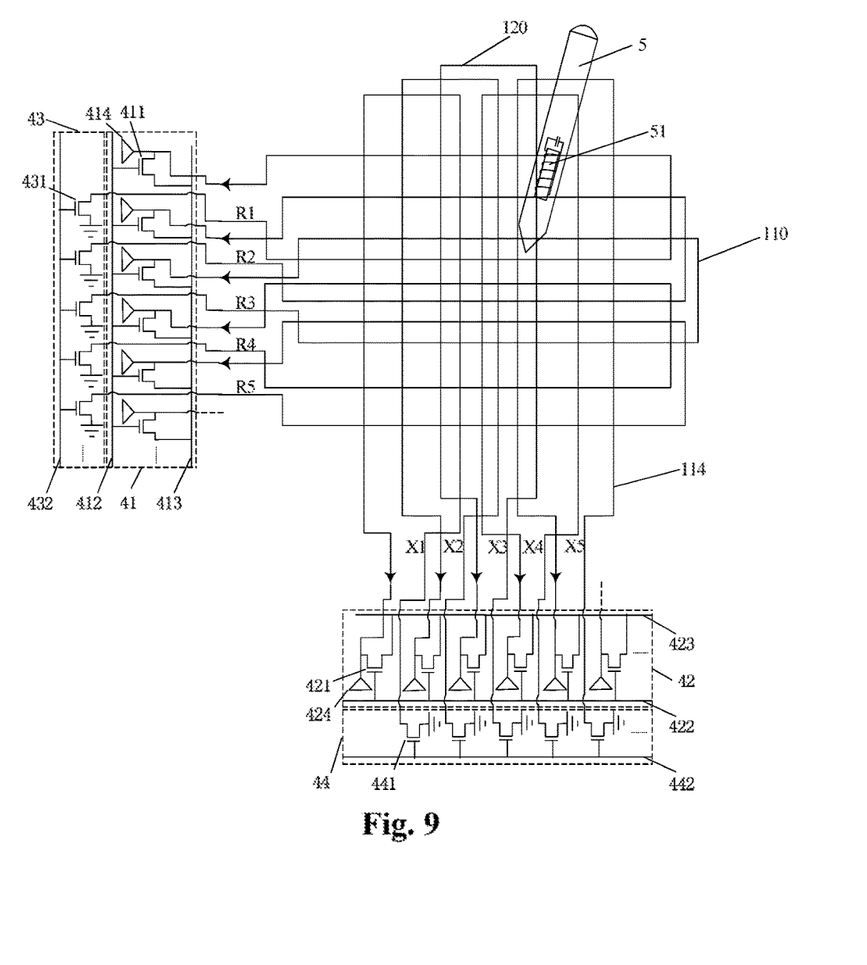
FIG. 9 illustrates an equivalent circuit of an electromagnetic-type touch display apparatus according to an embodiment of the present invention.

FIG. 9 illustrates an equivalent circuit of an electromagnetic-type touch display apparatus according to an embodiment of the disclosure. According to the embodiment, an electromagnetic-type touch substrate (not illustrated in FIG. 9) includes multiple first electromagnetic induction coils 110 which extend in a horizontal direction and form loops, and multiple second electromagnetic induction coils 120 which extend in a vertical direction and form loops. The first electromagnetic induction coils 110 are formed with a shielding electrode layer, and the second electromagnetic induction coils 120 are formed with a conductive black matrix layer or a common electrode layer. A first control circuit 41 is electrically connected to one side of the first electromagnetic induction coils 110. The first control circuit 41 includes multiple first TFTs (Thin Film Transistors) 411, a first control wire 412 for controlling states of the first TFTs 411, a first signal wire 413 and multiple first detecting units 414. Gate electrodes of the first TFTs 411 are electrically connected to the first control wire 412. Source electrodes of the first TFTs 411 are electrically connected to the first signal wire 413. Drain electrodes of the first TFTs 411 are electrically connected to one side of the first electromagnetic induction coils and to the first detecting units 414. Alternatively, the drain electrodes of the first TFTs 411 are electrically connected to the first signal wire 413, and the source electrodes of the first TFTs 411 are electrically connected to one side of the first electromagnetic induction coils and to the first detecting units 414.

A second control circuit 42 is connected to one side of the second electromagnetic induction coils 120. The second control circuit 42 includes multiple second TFTs 421, a second control wire 422 for controlling states of the second TFTs 421, a second signal wire 423 and multiple second detecting units 424. Gate electrode of the second TFTs 421 are electrically connected to the second control wire 422. Source electrodes of the second TFTs 421 are electrically connected to the second signal wire 423. Drain electrodes of the second TFTs 421 are electrically connected to one side of the second electromagnetic induction coils and to the second detecting units 424. Alternatively, the drain electrodes of the second TFTs 421 are electrically connected to the second signal wire 423, and the source electrodes of the second TFTs 421 are electrically connected to one side of the second electromagnetic induction coils and to the second detecting units 424.

In the case that the second electromagnetic induction coils 120 are formed with the conductive black matrix layer, during displaying an image, the first control wire 412 and the second control wire 422 respectively control all the first TFTs 411 and all the second TFTs 421 to turn off.

In the case that the second electromagnetic induction coils 120 are formed with the common electrode layer, during displaying an image, the second control wire 422 controls all the second TFTs 421 to turn on. A common voltage signal from the second signal wire 423 is applied to the second electromagnetic induction coils 120.

In case of detecting a touch, the first control wire 412 controls all the first TFTs 411 to turn off. The first electromagnetic induction coils 110 are independent from each other. Electromagnetic induction currents are generated in the first electromagnetic induction coils which are electromagnetic induced, and the electromagnetic induction currents are detected by the first detecting unit 414. Accordingly, a coordinate, in the vertical direction, of a touch position is determined and output. The second control wire 422 controls all the second TFTs 421 to turn off. The second electromagnetic induction coils 120 are independent from each other. Electromagnetic induction currents are generated in the second electromagnetic induction coils 120 which are electromagnetic induced, and the electromagnetic induction currents are detected by the second detecting unit 424. Accordingly, a coordinate, in the horizontal direction, of the touch position is determined and output.

In addition, as shown in FIG. 9, according to an embodiment, a first grounding unit 43 is connected to the first control circuit 41. The first grounding unit 43 includes multiple third TFTs 431, and a third control wire 432 controlling states of the third TFTs 431. Gate electrodes of the third TFTs 431 are electrically connected to the third control wire 432. Source electrodes of the third TFTs 431 are electrically connected to the other side of the first electromagnetic induction coils 110. Drain electrodes of the third TFTs 431 are grounded. Alternatively, the drain electrodes of the third TFTs 431 are electrically connected to the other side of the first electromagnetic induction coils 110, while the source electrodes of the third TFTs 431 are grounded.

A second grounding unit 44 is connected to the second control circuit 42. The second grounding unit 44 includes multiple fourth TFTs 441 and a fourth control wire 442 controlling states of the fourth TFTs 441. Gate electrodes of the fourth TFTs 441 are electrically connected to the fourth control wire 442. Source electrodes of the fourth TFTs 441 are electrically connected to the other side of the second electromagnetic induction coils 120. Drain electrodes of the fourth TFTs 441 are grounded. Alternatively, the drain electrodes of the fourth TFTs 441 are electrically connected to the other side of the second electromagnetic induction coils 120, while the source electrodes of the fourth TFTs 441 are grounded.

In the case that the second electromagnetic induction coils 120 are formed with a conductive black matrix layer, during displaying an image, the third control wire 432 and the fourth control wire 442 respectively control all the third TFTs 431 and all the fourth TFTs 441 to turn off.

In the case that the second electromagnetic induction coils 120 are formed with a common electrode layer, during displaying an image, the fourth control wire 442 controls all the fourth TFTs 441 to turn off. A common voltage signal is applied to the second electromagnetic induction coils 120.

In case of detecting a touch, the third control wire 432 controls all the third TFTs 431 to turn on, where electromagnetic induction currents are generated in the first electromagnetic induction coils 110 which are electromagnetic induced. The fourth control wire 442 controls all the fourth TFTs 441 to turn on, where electromagnetic induction currents are generated in the second electromagnetic induction coils 120 which are electromagnetic induced.

It should be noted that, according to an embodiment, the first TFTs 411 in the first control circuit 41, the third TFTs 431 in the first grounding unit 43, the second TFTs 421 in the second control circuit 42 and the fourth TFTs 441 in the second grounding unit 44 are formed on the array substrate. Since at borders of the array substrate, there is a non-display region in which the control circuits or other circuits may be arranged, the first TFTs 411, the second TFTs 421, the third TFTs 431 and the fourth TFTs 441 may be manufactured together with TFTs arranged on the array substrate for controlling pixel units. Hence, the manufacturing process is reduced. According to another embodiment, in the case that the switches in the first control circuit 41, in the second control circuit 42, in the first grounding unit 43 and in the second grounding unit 44 are implemented with other types of switches (not shown in FIG. 9) rather than the TFT switches, the first control circuit 41, the second control circuit 42, the first grounding unit 43 and the second grounding unit 44 may be made either on the array substrate (generally on a step of the array substrate with respect to the color film substrate), or in a client (not shown in FIG. 9) of an terminal product.

Therefore, the first electromagnetic induction coils 110 are controlled by the first control circuit 41 and the first grounded unit 43, and the second electromagnetic induction coils 120 are controlled by the second control circuit 42 and the second grounded unit 44. Hence, displaying and touch detection may be performed in a time division manner. Accordingly, the displaying and electromagnetic-type touch controlling of the touch display panel are integrated.

Moreover, in the electromagnetic-type touch substrate according to an embodiment of the disclosure, the first conductive layer (i.e., the shielding electrode layer) including the first electromagnetic induction coils is formed on one side of the substrate, and the second conductive layer (i.e., the black matrix layer or a common electrode layer) including the second electromagnetic induction coils is formed on the other side of the substrate. Compared with a conventional art in which a liquid crystal display panel and a module with an electromagnetic input function are assembled in an out-cell manner, the manufacturing process may be simplified, a thickness and a complexity of an electromagnetic-type touch screen may be reduced, a touch display panel is light and thin, and the manufacturing cost is saved.

In addition, in the case that a projection of each first electromagnetic induction coil onto the array substrate and a projection of each second electromagnetic induction coil onto the array substrate respectively cover at least one row of pixels or at least one column of pixels, if the number of rows or columns of pixels covered by each first electromagnetic induction coil or by each second electromagnetic induction coil is increased, the number of the first electromagnetic induction coils or the number of the second electromagnetic induction coils formed on the color film substrate is significantly reduced. Accordingly, the number of the second TFT switches 421 in the second control circuit or the number of the fourth TFT switches 441 in the second grounding unit 44 is significantly reduced. In case of a same resolution, as compared with a conventional art in which each sub-pixel is provided with one TFT switch for controlling the electromagnetic induction coil, the number of the TFT switches for controlling the electromagnetic induction coils is reduced by at least ⅔ in the disclosure. Since the number of the TFT switches for controlling the electromagnetic induction coils may be reduced in the disclosure, a width of the non-display region, which is arranged on borders of the touch display panel and is for arranging control switches, is reduced, and accordingly, an area of the display region of the touch display panel is increased, which is in accordance with a trend of narrower borders.

Furthermore, values of the induction currents generated by the first direction coils or by the second direction coils may be detected as follows.

As show in FIG. 9, an electromagnetic stylus 5 (or an electromagnetic pointer) is provided to corporate with the touch display panel. If the electromagnetic stylus is active, the first electromagnetic induction coils and the second electromagnetic induction coils generate induction currents due to inductions caused by electromagnetic signals. If the electromagnetic stylus is passive, the first detecting unit and the second detecting unit respectively provide driving electromagnetic signals to the first electromagnetic induction coils and the second electromagnetic induction coils, and then the first electromagnetic induction coils and the second electromagnetic induction coils generate the induction currents due to inductions caused by the electromagnetic signals. In the following, it is explained by taking a passive electromagnetic stylus as an example.

A resonance circuit 51 is arranged in the passive electromagnetic stylus 5. The touch display panel transmits energy into the passive electromagnetic stylus 5 by emitting high-frequency electromagnetic waves. Then the passive electromagnetic stylus 5 returns the electromagnetic signals to the touch display panel. At this time, the touch display panel stops emitting the electromagnetic waves, and is switched to a mode of receiving the electromagnetic waves. In the case that the electromagnetic stylus is near the touch display panel, electromagnetic inductions may take place in the first electromagnetic induction coils 110 and the second electromagnetic induction coils 120 in the touch control display panel. The electromagnetic induction currents generated in the first electromagnetic induction coils 110 are detected by a first detecting unit and are processed to obtain a coordinate of a position of the passive electromagnetic stylus 5 in a second direction (i.e. a vertical direction coordinate). The electromagnetic induction currents generated in the second electromagnetic induction coils 120 are detected by a second detecting unit and are processed to obtain a coordinate of the position of the passive electromagnetic stylus 5 in a first direction (i.e. a horizontal direction coordinate). After the coordinate in the first direction (i.e. the horizontal direction coordinate) and the coordinate in the second direction (i.e. the vertical direction coordinate) are obtained, the position of the passive electromagnetic stylus 5 may be determined.

The electromagnetic-type touch substrate and the electromagnetic-type touch display apparatus according to the embodiments of the disclosure are detailed as above. Examples are used herein to set forth the principle and embodiments of the disclosure, and the above descriptions of the embodiments are merely for helping in understanding the method and the core concept of the disclosure. Changes to the embodiments and the application range of the disclosure may be made by those skilled in the art based on the idea of the disclosure. In summary, the specification is not intended to limit the disclosure.

What is claimed is:

1. An electromagnetic-type touch display apparatus, comprising:
   a first substrate;
   a second substrate, arranged opposite to the first substrate, wherein a plurality of pixel units in rows and columns are formed on the second substrate;
   a first conductive layer, wherein the first conductive layer comprises a plurality of first strip-shaped sensing electrodes arranged in parallel for forming a plurality of first electromagnetic induction coils, each of the plurality of first electromagnetic induction coils is formed with at least two of the plurality of first strip-shaped sensing electrodes and connection lines, each of the plurality of first strip-shaped sensing electrodes has two long sides extending in a first direction, and two short sides; and
   a second conductive layer, wherein the second conductive layer comprises a plurality of second strip-shaped sensing electrodes arranged in parallel for forming a plurality of second electromagnetic induction coils, each of the plurality of second electromagnetic induction coils is formed with at least two of the plurality of second strip-shaped sensing electrodes and connection lines, and each of the plurality of second strip-shaped sensing electrodes has two long sides extending in a second direction perpendicular to the first direction and two short sides,
   wherein, either one of the first substrate and the second substrate comprises a display region and a non-display region having a plurality of connecting wires,
   wherein the first electromagnetic induction coils and the second electromagnetic induction coils are configured to determine a touch position,
   wherein, the second conductive layer is configured as a black matrix layer on a first side of the first substrate facing the second substrate or a common electrode layer including a plurality of common electrodes disposed on the second substrate, and
   wherein the second substrate comprises a thin film transistor element layer having a plurality of pixel electrodes and the plurality of common electrodes for forming the common electrode layer, wherein a horizontal electrical field is generated between an adjacent pair of one of the plurality of pixel electrodes and one of the plurality of common electrodes.

2. The electromagnetic-type touch display apparatus according to claim 1, wherein the black matrix layer comprises a conductive light-shading material comprising at least one of titanium sub-oxide and chromium.

3. The electromagnetic-type touch display apparatus according to claim 1, wherein in a case that the second conductive layer is configured as the black matrix layer on the first side of the first substrate facing the second substrate, the first conductive layer is configured as a transparent shielding electrode layer on a second side of the first substrate not facing the second substrate or the common electrode layer on the second substrate.

4. The electromagnetic-type touch display apparatus according to claim 1, wherein the first electromagnetic induction coils each or the plurality of second electromagnetic induction coils each comprises three sensing electrodes arranged in parallel, and wherein the three sensing electrodes are connected to each other by connecting wires in the non-display region.

5. The electromagnetic-type touch display apparatus according to claim 1, wherein each electromagnetic induction coil of the plurality of first electromagnetic induction coils and the plurality of second electromagnetic induction coils comprises a first sensing electrode, a second sensing electrode and a third sensing electrode, wherein the connecting wires comprises a first and a second connecting wire segments arranged in the non-display region,
   wherein the first sensing electrode and the second sensing electrode are connected by the first connecting wire segment, and the second sensing electrode and the third sensing electrode are connected to each other by the second connecting wire segment.

6. The electromagnetic-type touch display apparatus according to claim 1, the first conductive layer is further configured as a transparent shielding electrode layer.

7. The electromagnetic-type touch display apparatus according to claim 1, wherein in a case that the second conductive layer is configured as the common electrode layer, the first conductive layer is configured as a transparent shielding electrode layer on a second side of the first substrate not facing the second substrate or the black matrix layer on the first side of the first substrate facing the second substrate.

8. An electromagnetic-type touch display apparatus, comprising:
   a first substrate;
   a second substrate, arranged opposite to the first substrate, wherein a plurality of pixel units in rows and columns are formed on the second substrate;
   a first conductive layer, wherein the first conductive layer comprises a plurality of first strip-shaped sensing electrodes arranged in parallel for forming a plurality of first electromagnetic induction coils, each of the plurality of first electromagnetic induction coils is formed with at least two of the plurality of first strip-shaped sensing electrodes and connection lines, each of the plurality of first strip-shaped sensing electrodes has two long sides extending in a first direction, and two short sides; and
   a second conductive layer, wherein the second conductive layer comprises a plurality of second strip-shaped sensing electrodes arranged in parallel for forming a plurality of second electromagnetic induction coils, each of the plurality of second electromagnetic induction coils is formed with at least two of the plurality of second strip-shaped sensing electrodes and connection lines, and each of the plurality of second strip-shaped sensing electrodes has two long sides extending in a second direction perpendicular to the first direction and two short sides, wherein, either one of the first substrate and the second substrate comprises a display region and a non-display region having a plurality of connecting wires, wherein the first electromagnetic induction coils and the second electromagnetic induction coils are configured to determine a touch position, wherein, the second conductive layer is configured as a black matrix layer on a first side of the first substrate facing the second substrate or a common electrode layer including a plurality of common electrodes disposed on the second substrate; and wherein a projection onto the second substrate from each sensing electrode of the plurality of first strip-shaped sensing electrodes and the plurality of second strip-shaped sensing electrodes covers at least one row or one column of the plurality of pixel units on the second substrate.

9. An electromagnetic-type touch display apparatus comprising:
 a first substrate;
 a second substrate, arranged opposite to the first substrate, wherein a plurality of pixel units in rows and columns are formed on the second substrate;
 a first conductive layer, wherein the first conductive layer comprises a plurality of first strip-shaped sensing electrodes arranged in parallel for forming a plurality of first electromagnetic induction coils, each of the plurality of first electromagnetic induction coils is formed with at least two of the plurality of first strip-shaped sensing electrodes and connection lines, each of the plurality of first strip-shaped sensing electrodes has two long sides extending in a first direction, and two short sides;
 a second conductive layer, wherein the second conductive layer comprises a plurality of second strip-shaped sensing electrodes arranged in parallel for forming a plurality of second electromagnetic induction coils, each of the plurality of second electromagnetic induction coils is formed with at least two of the plurality of second strip-shaped sensing electrodes and connection lines, and each of the plurality of second strip-shaped sensing electrodes has two long sides extending in a second direction perpendicular to the first direction and two short sides,
 wherein, either one of the first substrate and the second substrate comprises a display region and a non-display region having a plurality of connecting wires,
 wherein the non-display region of the first substrate has a first area and a second area;
 wherein the first electromagnetic induction coils and the second electromagnetic induction coils are configured to determine a touch position,
 wherein, the second conductive layer is configured as a black matrix layer on a first side of the first substrate facing the second substrate or a common electrode layer including a plurality of common electrodes disposed on the second substrate; and
 a first control circuit electrically connected to the first electromagnetic induction coils in the first area of the non-display region of the first substrate; and a second control circuit electrically connected to the second electromagnetic induction coils in the second area of the non-display region of the first substrate;

wherein the first control circuit comprises:
 a plurality of first transistors;
 a first control wire configured to control the first transistors;
 a first signal wire; and
 a plurality of first detecting units;
wherein gate electrodes of the first transistors are electrically connected to the first control wire,
wherein a connection scheme of the first transistors is either, the source electrodes of the first transistors are electrically connected to the first signal wire, and the drain electrode of each of the first transistors is electrically connected to an associated first electromagnetic induction coil and an associated first detecting unit; or the drain electrodes of the first transistors are electrically connected to the first signal wire, and the source electrode of each of the first transistors is electrically connected to a corresponding first electromagnetic induction coil and a corresponding first detecting unit;
wherein the second control circuit comprises:
 a plurality of second transistors,
 a second control wire configured to control states of the second transistors,
 a second signal wire, and
 a plurality of second detecting units,
wherein the gate electrodes of the second transistors are electrically connected to the second control wire;
wherein a connecting scheme of the second transistors is either, the source electrodes of the second transistors are electrically connected to the second signal wire, and the drain electrode of each of the second transistors is electrically connected to a corresponding second electromagnetic induction coil and a corresponding second detecting unit; or the drain electrodes of the second transistors are electrically connected to the second signal wire, and the source electrode of each of the second transistors is electrically connected to a corresponding second electromagnetic induction coil and a corresponding second detecting unit,
wherein when a touch is detected, the first control wire turns off all the first transistors, wherein the first electromagnetic induction coils are electrically independent from each other;
wherein electromagnetically induced induction currents are generated in the first electromagnetic induction coils,
wherein the electromagnetically induced induction currents are detected by the first detecting unit;
wherein a coordinate of a touch position in the second direction is determined and a first signal indicating the coordinate of the touch position is output;
wherein the second control wire turns off all the second transistors, wherein the second electromagnetic induction coils are electrically independent from each other;
wherein electromagnetically induced induction currents are generated in the second electromagnetic induction coils;
wherein the electromagnetically induced induction currents are detected by the second detecting unit; and
wherein a coordinate of the touch position in the first direction is determined and a second signal indicating the coordinate of the touch position is output.

10. The electromagnetic-type touch display apparatus according to claim 9, in a case that the second conductive layer is configured as the black matrix layer on the first side of the first substrate facing the second substrate, and during displaying an image, the first control wire and the second control wire respectively turn off all the first transistors and all the second transistors.

11. The electromagnetic-type touch display apparatus according to claim 9, in a case that the second conductive layer is configured as the common electrode layer, during displaying an image, the second control wire controls all the second transistors to turn on and a common voltage signal from the second signal wire is applied to the second electromagnetic induction coils.

12. The electromagnetic-type touch display apparatus according to claim 9, further comprising a first grounding unit electrically connected to the first electromagnetic induction coils and a second grounding unit electrically connected to the second electromagnetic induction coils, wherein in response to detecting the touch, the electromagnetically induced induction currents are generated both in the first electromagnetic induction coils and in the second electromagnetic induction coils.

13. The electromagnetic-type touch display apparatus according to claim 12, wherein the first grounding unit comprises:

a plurality of third transistor switches, and
a third control wire configured to control states of the third transistor switches, wherein the gate electrodes of the third transistor switches are electrically connected to the third control wire,
wherein a connecting scheme of the third transistors is either the source electrode of each of the third transistor switches is electrically connected to a corresponding first electromagnetic induction coils, and the drain electrodes of the third transistor switches are grounded; or the drain electrode of each of the third transistor switches is electrically connected to a corresponding first electromagnetic induction coils, and the source electrodes of the third transistor switches are grounded;
wherein the second grounding unit comprises:
a plurality of fourth transistor switches; and
a fourth control wire configured to control states of the fourth transistor switches, wherein the gate electrodes of the fourth transistor switches are electrically connected to the fourth control wire;
wherein a connecting scheme of the forth transistors is either the source electrode of each of the fourth transistor switches is electrically connected to a corresponding second electromagnetic induction coil, and the drain electrodes of the fourth transistor switches are grounded; or the drain electrode of each of the fourth transistor switches is electrically connected to a corresponding second electromagnetic induction coil, and the source electrodes of the fourth transistor switches are grounded, and
wherein in response to detect the touch, the third control wire controls the third transistor switches to turn on, electromagnetically induced induction currents are generated in the first electromagnetic induction coils; and the fourth control wire controls all the fourth transistor switches to turn on, and electromagnetically induced induction currents are generated in the second electromagnetic induction coils.

14. The electromagnetic-type touch display apparatus according to claim 13, in a case that the second conductive layer is configured as the black matrix layer on the first side of the first substrate facing the second substrate, during displaying an image, the third control wire and the fourth control wire respectively control all the third transistor switches and all the fourth transistor switches to turn off.

15. The electromagnetic-type touch display apparatus according to claim 13, in a case that the second conductive layer is configured as the common electrode layer, during displaying an image, the fourth control wire controls all the fourth transistor switches to turn off and a common voltage signal is applied to the second electromagnetic induction coils.

* * * * *